United States Patent
Cargille et al.

(10) Patent No.: US 7,539,999 B2
(45) Date of Patent: May 26, 2009

(54) KERNEL-LEVEL TRANSACTIONS

(75) Inventors: Jon Cargille, Bellevue, WA (US); Surendra Verma, Bellevue, WA (US); Mark J. Zbikowski, Woodinville, WA (US); Dexter P. Bradshaw, Duvall, WA (US); James E. Johnson, Bellevue, WA (US); Muhunthan Sivapragasam, Kirkland, WA (US); Steven J. Malan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 694 days.

(21) Appl. No.: 10/692,264

(22) Filed: Oct. 23, 2003

(65) Prior Publication Data

US 2005/0091668 A1 Apr. 28, 2005

(51) Int. Cl.
*G06F 3/00* (2006.01)
*G06F 9/46* (2006.01)

(52) U.S. Cl. .................. 719/328; 718/101

(58) Field of Classification Search ............... 707/1–10, 707/200–203; 709/201–207, 217–219; 718/101, 718/104, 106; 719/311, 313, 318, 328–332, 719/316
See application file for complete search history.

(56) References Cited

U.S. PATENT DOCUMENTS

| | | | |
|---|---|---|---|
| 5,764,897 A | 6/1998 | Khalidi | |
| 5,765,153 A | 6/1998 | Benantar et al. | |
| 5,835,764 A * | 11/1998 | Platt et al. | 718/101 |
| 5,845,067 A | 12/1998 | Porter et al. | |
| 5,982,891 A | 11/1999 | Ginter et al. | |
| 6,026,402 A | 2/2000 | Vossen et al. | |
| 6,101,527 A * | 8/2000 | Lejeune et al. | 709/201 |
| 6,157,927 A * | 12/2000 | Schaefer et al. | 707/103 R |
| 6,266,666 B1 * | 7/2001 | Ireland et al. | 707/10 |
| 6,308,273 B1 | 10/2001 | Goertzel et al. | |
| 6,321,374 B1 * | 11/2001 | Choy | 717/106 |
| 6,405,317 B1 | 6/2002 | Flenley et al. | |
| 6,446,077 B2 | 9/2002 | Straube et al. | |
| 6,609,158 B1 | 8/2003 | Nevarez et al. | |
| 6,675,299 B2 | 1/2004 | Porter et al. | |
| 6,728,958 B1 * | 4/2004 | Klein et al. | 718/101 |
| 6,807,636 B2 | 10/2004 | Hartman et al. | |
| 6,850,893 B2 | 2/2005 | Lipkin et al. | |
| 6,922,685 B2 * | 7/2005 | Greene et al. | 707/1 |
| 2003/0050972 A1 * | 3/2003 | Felt et al. | 709/203 |

OTHER PUBLICATIONS

Liang, J et al. "Object Management Group object transaction service based on an X/Open and International Organization for Standardization open systems interconnection transaction processing kernel", Distrib. Syst. Engng. 4 (2997), pp. 151-159.

Cheung, S et al. "Java Transaction API(JTA)", Sun Microsystems Inc. Apr. 1999, pp. 1-60.

Limprecht, R. "Microsoft Transaction Server," IEEE, 1997 pp. 14-18.

(Continued)

*Primary Examiner*—Li B Zhen
*Assistant Examiner*—Charles E Anya
(74) *Attorney, Agent, or Firm*—Lee & Hayes, PLLC

(57) ABSTRACT

Transactions among kernel objects utilize application program interfaces (APIs) to implement operations on a transaction object and APIs to implement operations on a resource manager object.

27 Claims, 5 Drawing Sheets

OTHER PUBLICATIONS

Weikum, G. "Pros and Cons for Operating System Transactions for Database Systems", IEEE 1986, pp. 1219-1225.

Bertino, et al., "Advanced Transaction Processing in Multilevel Secure File Stores"; IEEE Transactions on Knowledge and Data Engineering. vol. 10. No. 1 pp. 120-135 1998.

Hildebrand, "Implementing the Win32 API Over a POSIX Real-Time OS"; Windows NT; Real-Time Magazine 97-2, pp. 25-26, 28-30.

Spector, et al., "Transactions: A Construct for Reliable Distributed Computing"; Department of Computer Science, Carnegie-Mellon University;pp. 18-35.

\* cited by examiner

ACL 410

ACE #1: SID #1...RIGHTS #1

ACE #2: SID #2...RIGHTS #2

ACE #3: SID #3...RIGHTS #3

ACE #4: SID #4...RIGHTS #4

ACE #5: SID #5...RIGHTS #5

ACE #6: SID #6...RIGHTS #6

ACE #7: SID #7...RIGHTS #7

ACE #8: SID #8...RIGHTS #8

ACE #9: SID #9...RIGHTS #9

ACE #10: SID #10...RIGHTS #10

ACE #11: SID #11...RIGHTS #11

ACE #12: SID #12...RIGHTS #12

FIG. 4

KERNEL-LEVEL TRANSACTIONS

FIELD

The present invention is directed towards kernel-level transactions.

BACKGROUND

Transactions have long been provided for by databases and transaction-processing systems. Transactions provide a simplified failure model, desirable to application programmers, by grouping together a number of operations into a single atomic operation, i.e., a group of operations of which the results of the individual operations stand or fall together. If just one operation fails, the effects of all operations in the group, regardless of the number of operations associated with the transaction, are "undone" or rolled back. This solidarity among operations is provided with regard to any number of failures, including failures that occur during the process of undoing operations, and eventually the respective transaction-processing system reaches one of two states whereby either all of the operations have been applied or none of the operations have been applied.

Transactional file systems, which define the directory structure for keeping track of files and the path syntax for applications, are now capable of driving transactions deep into an operating system (OS). Accordingly, secure transaction management services on a kernel level is desired.

SUMMARY

Kernel-level transactions are described herein.

Transactions may be implemented between kernel objects utilizing application program interfaces (APIs) to implement operations on a transaction object and APIs to implement operations on a resource manager object.

BRIEF DESCRIPTION OF THE DRAWINGS

The scope of the present invention will be apparent from the following detailed description, when taken in conjunction with the accompanying drawings, and such detailed description, while indicating embodiments of the invention, is illustrative only, since various changes and modifications will become apparent to those skilled in the art from the following detailed description, in which:

FIG. 4 shows an example of a security feature; and

DETAILED DESCRIPTION

Figure 1:
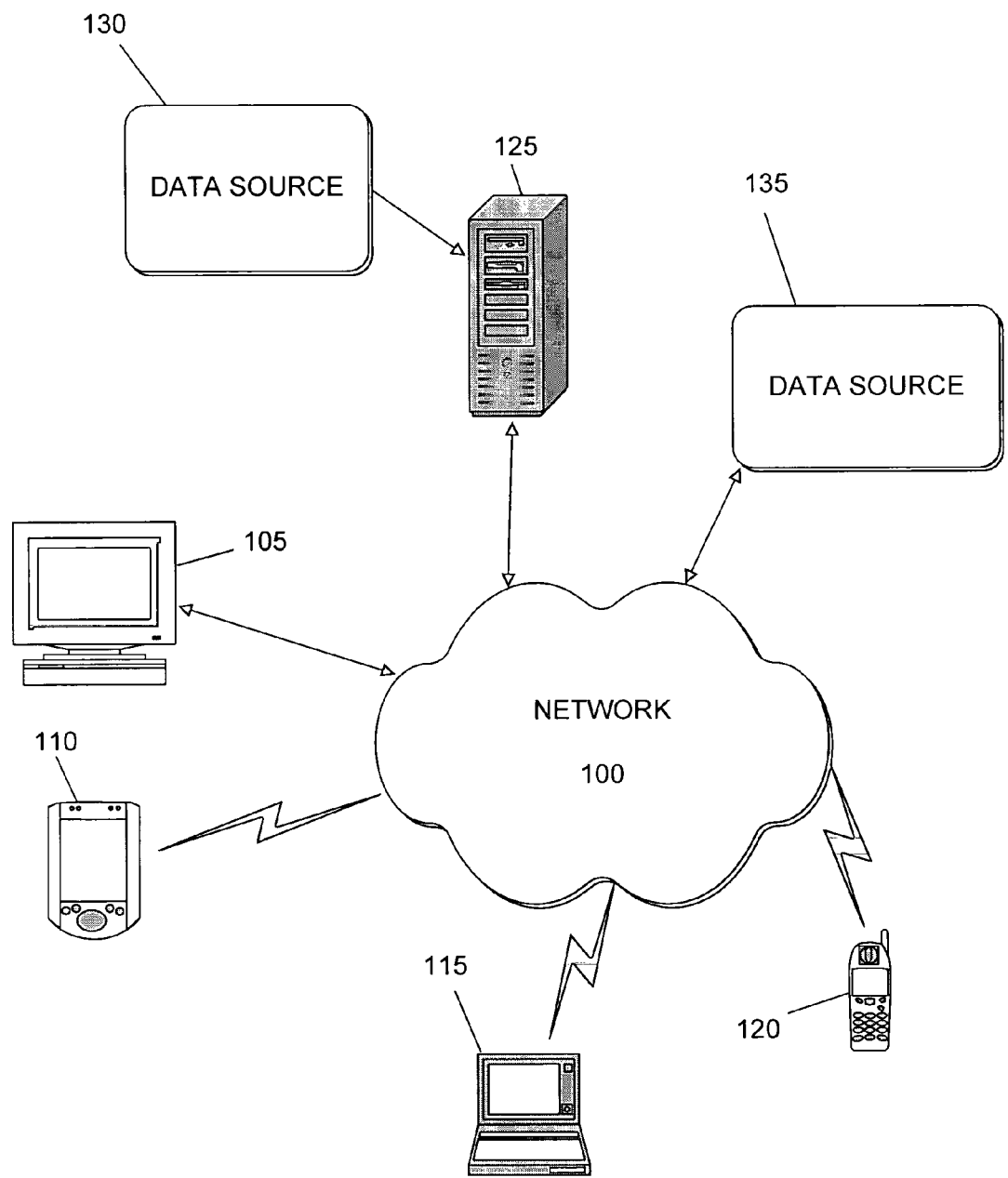
FIG. 1 shows an example of a client/network system.

In the example network environment of FIG. 1, multiple client computing devices 105, 110, 115, and 120, which may also be referred to as client devices, are coupled to at least one server device 125 via network 100. Network 100 is intended to represent any of a variety of conventional network topologies and types, which may include wired and/or wireless networks. Network 100 may further utilize any of a variety of conventional network protocols, including public and/or proprietary protocols. Network 100 may include, for example, the Internet as well as possibly at least portions of one or more local area networks (LANs).

Client device 105 may include any of a variety of conventional computing devices, including, but not limited to, a desktop personal computer (PC), workstations, mainframe computers, Internet appliances, and gaming consoles. Further client devices associated with network 100 may include personal digital assistant (PDA) 110, laptop computer 115, and cellular telephone 120, etc., which may be in communication with network 100 by a wired and/or wireless link. Further still, one or more of client devices 105, 110, 115, and 120 may include the same types of devices, or alternatively different types of devices.

Server device 125 may provide any of a variety of data and/or functionality to computing devices 105, 110, 115, and 120. The data may be publicly available or alternatively restricted, e.g., restricted to only certain users or available only if an appropriate fee is paid, etc.

Server device 125 is at least one of a network server and an application server, or a combination of both. Server device 125 is any device that is the source of content, and client devices 105, 110, 115, and 120 include any devices that receive such content. Therefore, in a peer-to-peer network, the device that is the source of the content is referred to as the server device and the device that receives the content is referred to as the client device. Both types of devices are able to load and run software programs, including operating systems and applications, in accordance with the example embodiments described herein. Further, data and functionality may be shared among client devices 105, 110, 115, and 120. That is, service device 125 is not the only source of data and/or functionality for the respective client devices.

At data source 130 or 135, software programs, including operating systems and applications, are prepared for and/or provided to any one of server device 125 or client devices 105, 110, 115, and 120 for execution. For the sake of consistency, the discussion hereafter refers to "applications" which encompass anyone of, at least, software programs, operating systems, and applications, either singularly or in combination, as known in the art. Furthermore, the applications are disseminated to server device 125 either off-line as from data source 130, or on-line as from data source 135. Further still, the applications are typically disseminated to client devices 105, 110, 115, and 120 on-line from server device 125 or from data source 135. Means and methods for off-line dissemination thereof are known as well.

The dissemination of at least one of data and functionality both in and among devices 105, 110, 115, 120, and 125 may be implemented as a transaction. More particularly, a transaction is a group of operations that are executed synchronously or asynchronously as a single atomic operation, either within one of devices 105, 110, 115, 120 and 125 or in a network environment, such as the example of FIG. 1. An example of transaction management is described beginning with reference to FIG. 2.

A group of operations that make up a particular transaction is to collectively have properties known, at least to those in the art, by the acronym "ACID," which includes "atomicity," "consistency," "isolation," and "durability." More specifically: data updates resulting from the respective operations of a transaction are either all permanent or none are permanent (atomicity); a transaction leaves underlying data in a consistent state (consistency); the effects of a transaction update are not visible to other concurrently-running operations until the overall transaction is made permanent (isolation); and after an outcome for a transaction has been determined, the result is guaranteed never to change (durability).

Figure 2:
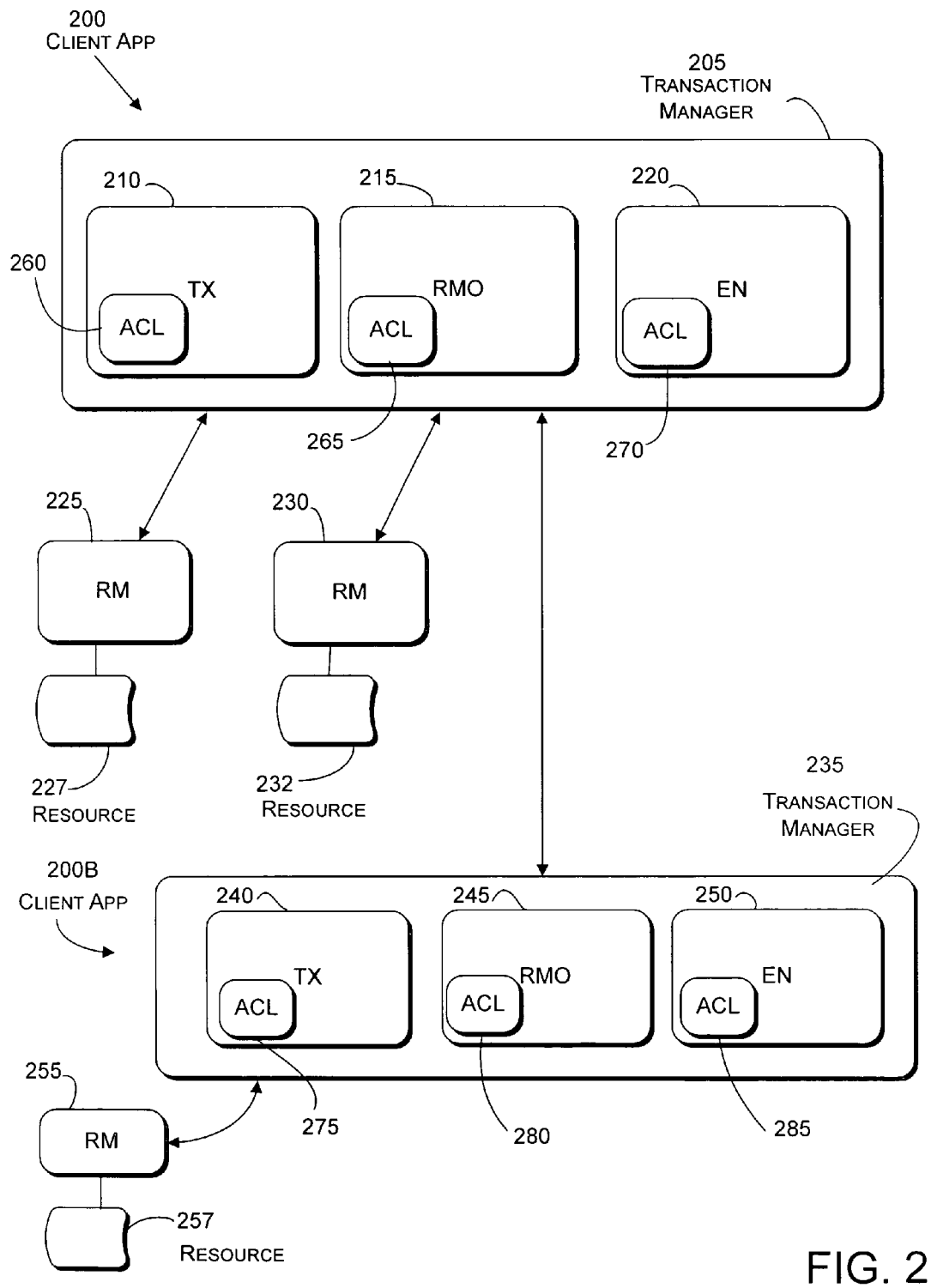
FIG. 2 shows an example of a component environment for implementing transaction management.

The kernel-level transaction management example of FIG. 2 is directed towards an example of a distributed transaction, involving more than one device, and maintains the "ACID" characteristics expected of a transaction. Further, whereas the example of FIG. 2 references kernel objects, the example is in no way limited to transactions implemented by kernel objects. More specifically, transactions, described herein, may be implemented by objected other than kernel objects.

In FIG. 2, a transaction corresponding to client application 200 utilizes, at least, transaction manager 205 on a first device, as well as client application 200B and transaction manager 235 on a second device. Client application 200B is associated with client application 200. Transaction managers 205 and 235, which are in communication with each other, may be aggregates of kernel objects that maintain state information about overall transactions and resources, and further coordinate interaction or protocol between client applications and associated resources managers (RM).

Resource managers, including RM 215 and RM 245 in the example of FIG. 2, maintain the state of at least one underlying resource that is capable of storing data in a durable state. Non-exclusive examples of such resources include databases and message queues. In a first device in the example embodiment of FIG. 2, RM 225 corresponds to resource 227; RM 230 corresponds to resource 232; and in a second device, RM 255 corresponds to resource 257.

As shown in FIG. 2, transaction manager 205 on a first device includes the following kernel objects: transaction object (TX) 210, resource manager object (RMO) 215, and enlistment object (EN) 220; and transaction manager 235 on a second device includes the following kernel objects: TX 240, RMO 245, and EN 250. TX represents a particular transaction, and may be opened by a process participating in the transaction. Further, TX may or may not be durable since a failure of one process corresponding to one of the kernel objects causes the entire transaction to abort, i.e., be rolled back.

RMO represents a relationship between TX of a corresponding transaction manager and at least one resource that participates in a particular transaction. Participation by RMO in a transaction includes receiving two-phase commit messages, and therefore RMO serves as an end point for receiving a transaction notification from a corresponding RM. Further, RMO is persistent so that the corresponding transaction manager knows which transaction outcome is to be transmitted to a corresponding RM. Alternatively, RMO may be transient thus enabling client applications to subscribe to a stream of transaction notifications without managing a persistent RMO across failures.

EN represents the relationship between a transaction and a resource manager. A resource manager indicates that it will participate in a transaction by creating an enlistment on it. When RMO has been requested to perform an operation (such as Prepare, Commit, etc) on a particular transaction, it uses EN to indicate participation. A resource manager can have more than one EN on a particular Transaction.

Figure 3:
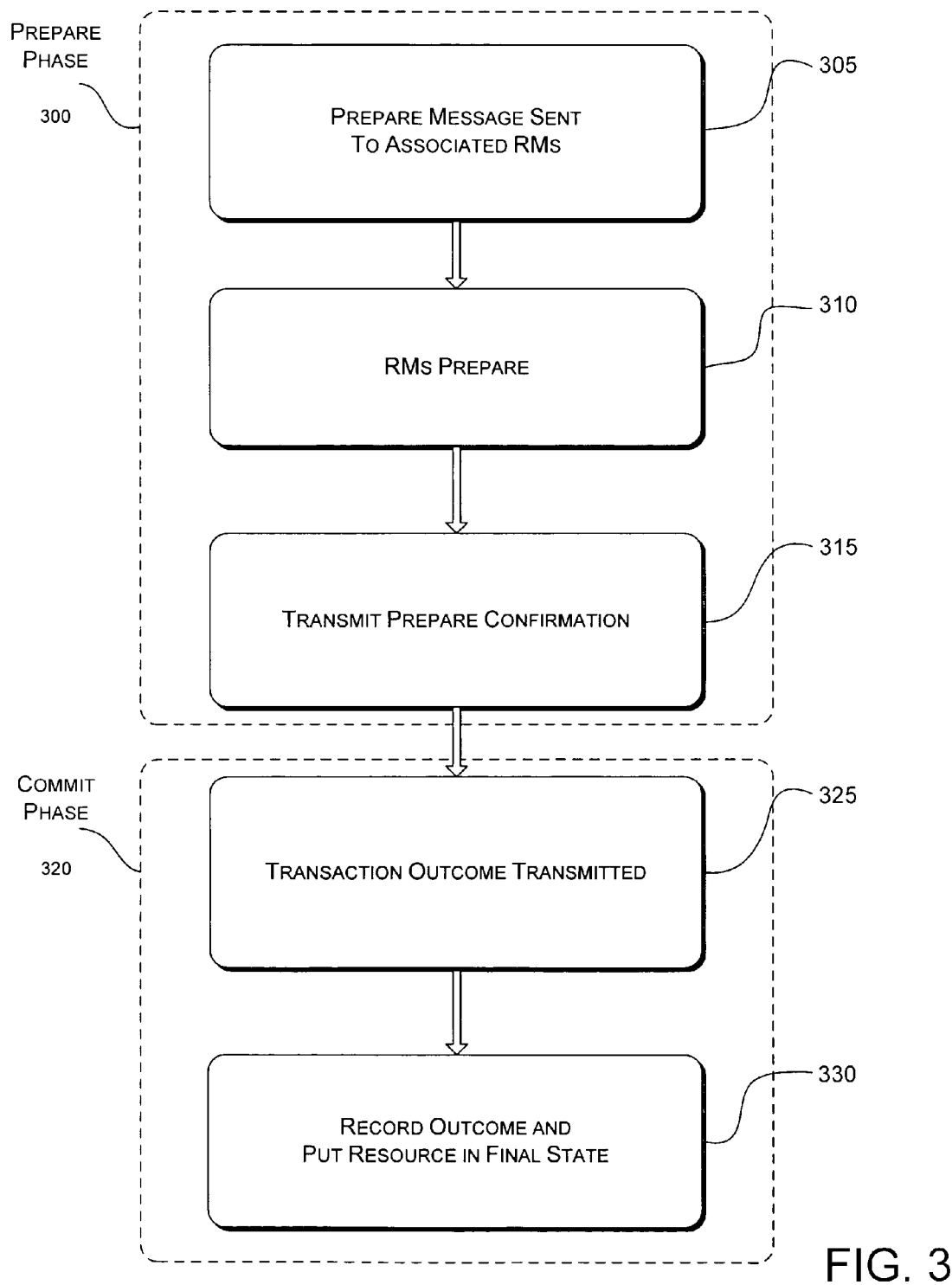
FIG. 3 shows an example processing flow for kernel-level transactions.

Two-phase commit protocol, which is implemented to ensure that a transaction successfully updates all appropriate resources, is described for a kernel environment with reference to the examples of FIGS. 2 and 3, as follows. In particular, after client application 200 opens kernel objects corresponding to transaction manager 205 on a first device and client application 200B opens kernel objects corresponding to transaction manager 235 on a second device, a "prepare" phase 305 commences with each RM in the transaction being sent 305 a "prepare" order from a corresponding transaction manager. Thus alerted, RM prepares 310 by rendering resource data in a durable state so that the data in the respective resources is capable of being "committed" or "rolled back." Upon preparing, RM transmits 315 a confirmation message to TX of the corresponding transaction manager.

The "commit" phase 320 is performed upon a resolution of the transaction, whereby TX of the transaction manager transmits 325 a transaction outcome of either "committed" or "abort/rolled back" to each associated RM. RM then records the outcome in an associated log, and the underlying resource data is either committed or rolled back, in accordance with the transaction outcome. Alternative embodiments may allow for volatile enlistments for which the data for the transaction is not durable, and therefore the data is not logged or recovered.

Transaction management on the kernel level may be implemented by utilizing application program interfaces (API) that are applicable to system architectures including, but not limited to, The Microsoft® Win32® application programming interface and The Microsoft® Windows® operating system. The APIs described herein are exposed via a handle-based interface, a "handle" referencing the API-intended object. Further, unless asynchronous operation is explicitly requested, operations on the respective kernel objects, particularly TX and RMO, are synchronous. Further still, the operations corresponding to different embodiments of a transaction may be implemented by various combinations of one or more of the APIs described herein. That is, some embodiments may use all of the APIs described herein, while other embodiments may use various combinations thereof.

APIs to implement operations on EN kernel objects, and a corresponding description of the functionality of the API are provided below (more detailed descriptions of the associated routines are provided even further below):

PreprepareEnlistment: also known as "Phase 0" processing, requests that TX transmit a pre-prepare message to all associated RMs;

PrepareEnlistment: requests that TX transmit a prepare request to all enlisted RMs; and CommitComplete: indicates that RM has completed committing the transaction work as requested by the corresponding transaction manager.

The PreprepareEnlistment and PrepareEnlistment indicate that Preprepare and Prepare processing are to be performed on a TX associated with EN.

APIs to implement operations on TX kernel objects, and a corresponding description of the functionality of the API, are provided below (more detailed descriptions of the associated routines are provided even further below):

CreateTransaction: opens a new TX;

OpenTransaction: opens an existing TX;

CommitTransaction: requests that TX be committed;

RollbackTransaction: requests that TX abort or rollback the transaction;

SavepointTransaction: requests that TX save the state of the transaction;

GetTransactionInfo: retrieve information about the TX; and

SetTransactionInfo: sets information about the TX.

APIs utilized to implement operations on RMO kernel objects, and a corresponding description of the functionality of the API, are provided below (more detailed descriptions of the associated routines are provided even further below):

CreateResourceManager: create a new RMO that represents a resource;

OpenResourceManager: open an existing RMO;

DestroyResourceManager: destroy RMO, thus rendering it non-persistent;

GetResourceManagerInfo: retrieve information about RMO;

SetResourceManagerInfo: set information about RMO;

CreateEnlistment: causes RMO to join a transaction, and retrieves related notifications; and GetNotificationResourceManager: queries for, and returns, an available RM notification.

APIs utilized to implement operations on TX kernel objects by an RMO kernel object after joining a transaction, and a corresponding description of the functionality of the API, are provided below (more detailed descriptions of the associated routines are provided even further below):

PrePrepareComplete: indicates that RM has completed pre-preparing as requested by a corresponding transaction manager;

PrepareComplete: indicates that RM has completed preparing a transaction as requested by the corresponding transaction manager;

RollbackComplete: indicates that RM has completed rolling back the transaction work performed as requested by the corresponding transaction manager; and CommitComplete: indicates that RM has completed committing the transaction work as requested by the corresponding transaction manager.

Unfortunately, APIs associated with kernel objects TX, RMO, and EN utilized to implement transaction management may expose one or more of the kernel objects to various security attacks. For instance, a malicious or invalid RM may enlist itself into a transaction to cause denial-of-service attacks by never responding to function calls or, alternatively, force transaction aborts. Therefore, a further illustrative example, also referring to FIG. 2, is directed towards secure, kernel-level, distributed transaction.

The example embodiment of FIG. 2 further provides a security solution for vulnerable kernel objects by applying a security descriptor, which may include an access control list (ACL), to at least one of the respective kernel objects.

In a first device ACL 260 is applied to TX 210, ACL 265 is applied to RMO 215, and ACL 270 is applied to EN 220. In a second device, ACL 275 is applied to TX 240, ACL 280 is applied to RMO 245, and ACL 285 is applied to EN 250.

An ACL defines the "rights" that a particular user or user group is allowed or denied to exercise over a particular object. More specifically, as shown in the example ACL 410 of FIG. 4, an ACL that is applied or attached to a kernel object includes at least access control entry (ACE) that comprises a corresponding security identifier (SID) and a corresponding set of rights. ACE entries 1-12 in FIG. 4 include, respectively, corresponding SIDs 1-12 and corresponding RIGHTs 1-12.

SIDs 1-12 identify either a user or a user group that may attempt to perform an operation, or a series of operations, on the kernel object to which the ACL is applied. RIGHTs 1-12 specify an operation or series of operations capable of being performed on the respective kernel object by the user or user group identified by the SID, and further specify the accessibility of such operation or operations to the identified user or user group. That is, RIGHTs 1-12 may indicate either that the identified user or user group is permitted to perform a specified operation, or that the identified user or user group is prohibited to perform a specified operation.

The following is a list of example operations that may be specified by RIGHTs 1-12 in an ACL applied to TX, followed by a description of the functionality of the operation. RIGHTs 1-12 further specify that the operation is permitted or denied on TX to the user or user group identified by the corresponding SID.

TRANSACTION_QUERY_INFORMATION: to get information about TX;

TRANSACTION_SET_INFORMATION: to set information about TX;

TRANSACTION_ENLIST: to enlist on TX in the transaction;

TRANSACTION_COMMIT: to render all data updates associated with TX durable;

TRANSACTION_ROLLBACK: to abort, i.e., rollback the operation on TX;

TRANSACTION_PROPOGATE: to transmit data from TX to another object;

TRANSACTION_SAVEPOINT: to save the current point of the transaction; and

TRANSACTION_MARSHAL: to transmit data regarding the transaction to another device.

The following is a list of example operations that may be specified by RIGHTs 1-12 in an ACL applied to RMO, followed by a description of the functionality of the operation. RIGHTs 1-12 further specify that the operation is permitted or denied on RMO to the user or user group identified by the corresponding SID.

RESOURCEMANAGER_QUERY_INFORMATION: to get information about RMO;

RESOURCEMANAGER_SET_INFORMATION: to set information about RMO;

RESOURCEMANAGER_RECOVER: to determine the state of a transaction at moment of transaction failure;

RESOURCEMANAGER_ENLIST: to enlist RMO in a transaction;

RESOURCEMANAGER_GET_NOTIFICATION: to receive notification upon resolution of transaction from transaction manager;

RESOURCEMANAGER_REGISTER_PROTOCOL: to register a protocol that RMO supports in the transaction; and RESOURCEMANAGER_COMPLETE_PROPOGATION: to set resource in accordance with transaction resolution.

The following is a list of example operations that may be specified by RIGHTs 1-12 in an ACL applied to EN, followed by a description of the functionality of the operation. RIGHTs 1-12 further specify that the operation is permitted or denied on EN to the user or user group identified by the corresponding SID.

ENLISTMENT_QUERY_INFORMATION: to get information about EN;

ENLISTMENT_SET_INFORMATION: to set information about EN;

ENLISTMENT_RECOVER: to determine state of enlistments at moment of transaction failure;

ENLISTMENT_REFERENCE: to obtain and reference (or dereference) an enlistment key;

ENLISTMENT_SUBORDINATE_RIGHTS: to rollback the transaction and to respond to notifications; and ENLISTMENT_SUPERIOR_RIGHTS: to perform operations a superior transaction manager would perform; such as initiate a preprepare, prepare, or superior rollback operation in a transaction.

Accordingly, each of kernel objects TX, RMO, and EN may have an ACL respectively applied thereto. Thus, when an API attempts to initiate an operation on a respective one of the kernel objects, the ACL must be honored by determining whether the operation is permitted or denied to the user or user group from which the API originates.

More specifically, when a handle is opened for performing an operation, a user or user group corresponding to the API is checked against the SID in the ACL; a list of allowed operations is generated; and the operation specified by the API is checked against the allowed operations for the SID on a given handle.

Alternative embodiments for securing transaction management among kernel objects, and enforcing security parameters, includes applying security descriptors to kernel objects that may participate in a transaction in accordance with the security model for The Microsoft® Windows® operating system.

As set forth above, the APIs are exposed as a handle-based interface, which is utilized to implement the security model. The following includes a more detailed description of the APIs, listed above, to implement operations on either EN or TX kernel objects. The descriptions include a description of the routine, corresponding arguments, and return values.

PreprepareEnlistment

| (IN | PHANDLE | EnlistmentHandle). |
|---|---|---|

This routine requests that a Transaction (associated with the enlistment) be "pre-prepared" by issuing a Pre-Prepare request to all associated RMs. The Enlistment is to be recorded as a Superior Enlistment. PrePrepare allows an RM with cache-like properties an opportunity to flush its caches, possibly to other RMs, before the Transaction enters the Prepared state, in which down-stream RMs can no longer accept changes.

If this routine is not called and a transaction participant has requested Phase0 processing, PrePrepare requests are issued as requested when a Prepare is received. However, some configurations that include cache-like RMs may cause unnecessary transaction rollbacks in distributed scenarios if there is no PreprepareEnlistment.

Arguments:
EnlistmentHandle: Supplies a handle indicating the Enlistment to be pre-prepared; this Enlistment indicates the Superior-TM/CRM that is pre-preparing the transaction. Only this Superior-TM/CRM will be able to call PrepareEnlistment, Superior CommitTransaction, and Superior RollbackTransaction on this transaction.

Return Value:
STATUS_SUCCESS
STATUS_ACCESS_DENIED
STATUS_INVALID_HANDLE
STATUS_INSUFFICIENT_RESOURCES
STATUS_TM_TOO_LATE PrepareEnlistment

| (IN | PHANDLE | EnlistmentHandle). |
|---|---|---|

This routine requests that a Transaction (associated with the enlistment) be "prepared" by issuing a Prepare request to all of its associated ResourceManagers. This request begins the two-phase commit protocol.

A transaction participant issuing PrepareEnlistment renders the Transaction object into a durable state that will survive system or application crashes; such a participant performs recovery on the transaction after any type of failure in order to deliver an outcome. Failure to fulfill this requirement may result in resource leaks, as well as inconsistent transaction outcomes.

Arguments:
EnlistmentHandle: Supplies a handle for the Enlistment to be prepared; the transaction associated with this enlistment has been pre-prepared (via a call to PreprepareEnlistment), then ResourceManagerHandle matches the Superior-TM/CRM that was used in the call to PreprepareEnlistment. Furthermore, only the Superior-TM/CRM that calls this API will be allowed to call Superior Committransaction and Superior RollbackTransaction on this transaction.

Return Value:
STATUS_SUCCESS
STATUS_ACCESS_DENIED
STATUS_INVALID_HANDLE
STATUS_INSUFFICIENT_RESOURCES
STATUS_TM_TOO_LATE
STATUS_RM_NOT_RECOVERABLE CreateTransaction

| (OUT PHANDLE | TransactionHandle, | |
|---|---|---|
| IN ULONG | DesiredAccess | OPTIONAL; |
| IN POBJECT_ATTRIBUTES | ObjectAttributes | OPTIONAL; |
| IN ULONG | CreateOptions | OPTIONAL; |
| IN PHANDLE | ResourceManagerHandle | OPTIONAL; |
| IN NOTIFICATION_MASK | NotificationMask | OPTIONAL; |
| IN LPVOID | TransactionKey | OPTIONAL). |

This routine creates a new Transaction object, and returns a handle to the new object.

In some embodiments (if the ResourceManagerHandle parameter is specified), this routine performs a "Join" (CreateEnlistment) operation on the Transaction after it is successfully created.

Clients close the transaction handle using the CloseHandle API. If the last transaction handle closes without anyone calling CommitTransaction on the transaction, then the transaction is implicitly rolled back.

Arguments:
TransactionHandle: Supplies a pointer to the location that will receive a handle to the new Transaction;
DesiredAccess: Supplies the mask specifying the desired level of access. The valid access mask choices are:

| | |
|---|---|
| SYNCHRONIZE | Can perform synchronization operations on this handle. |
| TRANSACTION_COMMIT | Can use this handle to commit transaction |
| TRANSACTION_PREPARE | Can use this handle to commit transaction |
| TRANSACTION_ROLLBACK | Can use this handle to abort transaction |
| TRANSACTION_SAVEPOINT | Can use this handle to create savepoints for the transaction |
| TRANSACTION_JOIN | Can use this handle to join this transaction as an RM |
| TRANSACTION_READ_ATTRIBUTES | Can read attributes associated with transaction |
| TRANSACTION_WRITE_ATTRIBUTES | Can write attributes associated with transaction; |
| ObjectAttributes: | Supplies a pointer to an optional object attributes structure; |
| CreateOptions | Supplies optional transaction flags. Valid create flag choices include: |
| TRANSACTION_CREATE_PRESUMED_NOTHING | Creates a "presumed nothing" transaction. |

ResourceManagerHandle: Supplies a handle to the ResourceManager that receives notifications about a specified transaction;

NotificationMask: Specifies the notifications that this ResourceManager would like to receive regarding this Transaction; and TransactionKey: Specifies an opaque pointer value that the RM would like to receive along with any notifications for this Transaction. The RM may use this to associate notifications with some object in the RM's address space, thus obviating the need to perform a lookup each time a notification occurs.

Return Value:
STATUS_SUCCESS
STATUS_INVALID_PARAMETER
STATUS_OBJECT_NAME_COLLISION
STATUS_OBJECT_NAME_INVALID
STATUS_PRIVILEGE_NOT_HELD
STATUS_INSUFFICIENT_RESOURCES OpenTransaction

| | | |
|---|---|---|
| (OUT PHANDLE | TransactionHandle, | |
| IN ACCESS_MASK | DesiredAccess, | |
| IN POBJECT_ATTRIBUTES | ObjectAttributes, | |
| IN PHANDLE | ResourceManagerHandle | optional, |
| IN NOTIFICATION_MASK | NotificationMask | optional, |
| IN LPVOID | TransactionKey | optional). |

This routine looks up an existing Transaction object, and returns a handle to the Transaction. The caller specifies a string representation of a GUID in an ObjectName field of ObjectAttributes.

Alternatively (if the ResourceManagerHandle parameter is specified), this routine also performs a "Join" operation on the Transaction after it is opened.

Clients close the transaction handle using a CloseHandle API. If the last transaction handle closes without anyone calling CommitTransaction on the transaction, then the transaction is implicitly rolled back the transaction.

Arguments:
TransactionHandle: Supplies a pointer to the location that will receive a handle to the Transaction if the open operation succeeds;

DesiredAccess: Supplies the mask specifying the desired level of access;

ObjectAttributes: Supplies a pointer to an optional object attributes structure;

ResourceManagerHandle: Supplies a handle to the ResourceManager that receives notifications about the specified Transaction;

NotificationMask: Specifies notifications that this ResourceManager may receive regarding this Transaction; and TransactionKey: Optionally specifies an opaque pointer value that the RM would like to receive along with any notifications for this Transaction. The RM may use this to associate notifications with some object in the RM's address space, thus obviating the need to perform a lookup each time a notification occurs.

Return Value:
STATUS_SUCCESS
STATUS_INVALID_PARAMETER
STATUS_OBJECT_NAME_INVALID
STATUS_OBJECT_NAME_NOT_FOUND
STATUS_OBJECT_PATH_SYNTAX_BAD
STATUS_PRIVILEGE_NOT_HELD
STATUS_INSUFFICIENT_RESOURCES CommitTransaction

| | | |
|---|---|---|
| (IN PHANDLE | TransactionHandle | |
| IN ULONG | CommitOptions | Optional). |

This routine requests that the Transaction associated with TransactionHandle be committed. Any transaction handle that has been opened or created may be committed with Transaction_Commit Desired Access. Since there is no restriction stating that only the creator of a transaction is allowed to commit it.

If the Transaction in question has not been previously issued a PrepareEnlistment request, then a two-phase commit protocol may be initiated on all enlisted RMs. This call can be viewed as a single-phase commit request being issued by the client.

This routine is not called if the Transaction has previously been prepared via PrepareEnlistment. Only an RM that called PrepareEnlistment may resolve the transaction state using the routine Superior CommitTransaction.

Arguments:
TransactionHandle: Supplies a handle indicating the Transaction to be committed; and
CommitOptions: COMMIT_RETAINING Transaction will be committed.

Return Value:
STATUS_SUCCESS
STATUS_ACCESS_DENIED
STATUS_INVALID_HANDLE
STATUS_INSUFFICIENT_RESOURCES
STATUS_TM_TRANSACTION_ABORTED RollbackTransaction

| (IN | PHANDLE | TransactionHandle, | |
|---|---|---|---|
| IN | SAVEPOINT | SavePoint | Optional, |
| IN | ROLLBACK_REASON | RollbackReason | Optional). |

This routine requests that the Transaction associated with TransactionHandle be rolled back. The rollback may be a partial rollback if the optional SavePoint is specified and is a valid savepoint. A NULL SavePoint argument indicates that the Transaction should be completely rolled back, or aborted. An optional RollbackReason structure may be supplied; this will be retained in the Transaction object, and may be retrieved by interested transaction participants via a call to GetInformationTransaction.

Arguments:
TransactionHandle: Supplies a handle indicating the Transaction to be rolled back;
SavePoint: Supplies a SavePoint name, indicating how far a state of a transaction should be rolled back; and
RollbackReason: Supplies a rollback reason.

Return Value:
STATUS_SUCCESS
STATUS_ACCESS_DENIED
STATUS_INVALID_HANDLE
STATUS_INSUFFICIENT_RESOURCES
STATUS_TM_TRANSACTION_COMMITTED SavepointTransaction

| (IN PHANDLE | TransactionHandle, | |
|---|---|---|
| IN ULONG | SavepointFlags | Optional, |
| OUT LPSAVEPOINT | SavePoint). | |

This routine requests that a "savepoint" be generated for a Transaction associated with TransactionHandle; this savepoint is used as a target for subsequent rollback requests.

Arguments:
TransactionHandle: Supplies a handle indicating the Transaction for which a Savepoint should be established;
SavepointFlags: Optionally supplies a set of flags that affect the generation of the savepoint; and
SavePoint: Supplies a pointer to a location where a Savepoint identifier is stored.

Return Value:
STATUS_SUCCESS
STATUS_ACCESS_DENIED
STATUS_INVALID_HANDLE
STATUS_INSUFFICIENT_RESOURCES
STATUS_TM_TRANSACTION_COMMITTED
STATUS_TM_TRANSACTION_ABORTED QueryInformationTransaction

| (IN | HANDLE | TransactionHandle, |
|---|---|---|
| IN | TRANSACTION_INFORMATION_CLASS | TransactionInformationClass, |
| OUT | PVOID | TransactionInformation, |
| IN | ULONG | TransactionInformationLength, |
| OUT | PULONG | ReturnLength Optional). |

This routine returns requested information about the Transaction object represented by TransactionHandle.

Arguments:
TransactionHandle: Supplies a handle indicating a Transaction for which information is being requested;
TransfactionInformationClass: Indicates what class of information about the Transaction object is being requested;
TransactionInformation: Supplies a pointer to a buffer where the transaction information requested is stored;
TransactionInformationLength: Indicates the length of the buffer pointed to by TransactionInformation; and
ReturnLength: Supplies a pointer to the location that will receive the length of the information written to the TransactionInformation buffer.

Return Value:
STATUS_SUCCESS
STATUS_ACCESS_DENIED
STATUS_INVALID_HANDLE
STATUS_INSUFFICIENT_RESOURCES
STATUS_INVALID_INFO_CLASS
STATUS_INFO_LENGTH_MISMATCH SetInformationTransaction

| | | |
|---|---|---|
| (IN | HANDLE | TransactionHandle, |
| IN | TRANSACTION_INFORMATION_CLASS | TransactionInformationClass, |
| IN | PVOID | TransactionInformation, |
| IN | ULONG | TransactionInformationLength). |

This routine sets the requested information about the Transaction object represented by TransactionHandle.
Arguments:
  TransactionHandle: Supplies a handle indicating the Transaction whose information will be modified;
  TransactionInformationClass: Indicates which class of information about the Transaction object is being requested;
  TransactionInformation: Supplies a pointer to a buffer where the transaction information requested is stored;
  TransactionInformationLength: Indicates a length of the buffer pointed to by TransactionInformation; and
  ReturnLength: Supplies a pointer to a location that will receive the length of the information written to the TransactionInformation buffer.
Return Value:
  STATUS_SUCCESS
  STATUS_ACCESS_DENIED
  STATUS_INVALID_HANDLE
  STATUS_INSUFFICIENT_RESOURCES
  STATUS_INVALID_INFO_CLASS
  STATUS_INFO_LENGTH_MISMATCH The following includes a more detailed description of the APIs, listed above, to implement operations on RMO kernel objects. The descriptions include a description of the routine, corresponding arguments, and return values.

CreateResourceManager

| | | | |
|---|---|---|---|
| (OUT | PHANDLE | ResourceManagerHandle, | |
| IN | ACCESS_MASK | DesiredAccess | Optional, |
| IN | POBJECT_ATTRIBUTES | ObjectAttributes, | |
| IN | ULONG | CreateOptions | Optional, |
| IN | RM_NOTIFICATION_ROUTINE | NotificationRoutine | Optional). |

This routine creates a new ResourceManager object to represent a resource.

A ResourceManager object also serves as an endpoint for TM notifications regarding Transactions that the RM has joined; an RMs requests these notifications by calling GetNotificationResourceManager.

A ResourceManager is normally a persistent object, i.e., the object must be re-opened and perform recovery after every failure (system or RM). An transient version of a ResourceManager object may be created by specifying the option RESOURCEMANAGER_NO_RECOVERY. A transient RM is not obligated or permitted to perform recovery. The non-recoverable RM option allows an application or an RM to receive notifications about transaction progress (e.g. PREPREPARE, PRE-PARE, COMMIT) without being required to implement the full complexity of logging prepares and performing recovery.

Arguments:
  ResourceManagerHandle: Supplies a pointer to the location that will receive a handle to the new ResourceManager;
  DesiredAccess: Supplies a mask specifying a desired level of access. Valid access mask choices are:
    SYNCHRONIZE: to synchronize operations on a handle,
    RESOURCE MANAGER_DESTROY: to destroy this resource manager,
    RESOURCE MANAGER_READ_ATTRIBUTES: to read attributes associated with a resource manager,
    RESOURCE MANAGER_WRITE_ATTRIBUTES: to write attributes associated with a resource manager;
  ObjectAttributes: Specifies the attributes for the new RM object; this includes the RM name;
  CreateOptions: Specifies options for the created object;
    RESOURCEMANAGER_NO_RECOVERY: ResourceManager object is non-persistent, and does not perform recovery;
    RESOURCEMANAGER_COMMUNICATION: ResourceManager knows how to communicate to other computers. ResourceManager may be used to marshall or unmarshall transactions;
    RESOURCEMANAGER_CLUSTER_RECOVERY: ResourceManager knows how to read/deliver outcomes to log files that may have failed over to other nodes in the cluster. ResourceManager may be used to recover transactions in a cluster; and
  NotificationRoutine: Specifies a notification routine to be called when notifications are available for this ResourceManager.
Return Value:
  STATUS_SUCCESS
  STATUS_INVALID_PARAMETER
  STATUS_OBJECT_NAME_COLLISION
  STATUS_OBJECT_NAME_INVALID
  STATUS_PRIVILEGE_NOT_HELD OpenResourceManager

| (OUT PHANDLE | ResourceManagerHandle, | |
|---|---|---|
| IN ACCESS_MASK | DesiredAccess | Optional, |
| IN POBJECT_ATTRIBUTES | ObjectAttributes, | |
| IN ULONG | OpenOptions | Optional, |
| IN RM_NOTIFICATION_ROUTINE | NotificationRoutine | Optional). |

This routine opens an existing ResourceManager object by name. If a target ResourceManager object is persistent but currently un-opened, the object is initially in a "recovering" state and must be recovered; after recovery is complete, RecoveryCompleteResourceManager must be called.
Arguments:
  ResourceManagerHandle: Supplies a pointer to the location that will receive a handle to the existing ResourceManager object;
  DesiredAccess: Supplies the mask specifying the desired access to this object;
  ObjectAttributes: Specifies the attributes for the new RM object;
  OpenOptions: Specifies options for the object. Valid options include:
  RESOURCE_MANAGER_DETAILED_RECOVERY_NOTIFICATIONS
    The resource manager receives detailed recovery notifications (with additional information about communication endpoints) instead of normal recovery notifications; and
  NotificationRoutine: Specifies a notification routine that will be called when notifications are available for this ResourceManager.
Return Value:
STATUS_SUCCESS
STATUS_INVALID_PARAMETER
STATUS_OBJECT_NAME_INVALID
STATUS_OBJECT_NAME_NOT_FOUND
STATUS_OBJECT_PATH_SYNTAX_BAD
STATUS_PRIVILEGE_NOT_HELD
STATUS_INSUFFICIENT_RESOURCES.
DestroyResourceManager

| (IN PHANDLE | ResourceManagerHandle). |
|---|---|

This routine destroys a ResourceManager object, causing it to no longer be persistent.
Arguments:
  ResourceManagerHandle: Supplies a handle indicating the ResourceManager object to be destroyed.
Return Value:
STATUS_SUCCESS
STATUS_ACCESS_DENIED
STATUS_INVALID_HANDLE
STATUS_INSUFFICIENT_RESOURCES
STATUS_TM_NEEDS_RECOVERY.
QueryInformationResourceManager

| (IN HANDLE | ResourceManagerHandle, |
|---|---|
| IN RESOURCEMANAGER_INFORMATION_CLASS | ResourceManagerInformationClass, |

-continued

| OUT PVOID | ResourceManagerInformation, |
|---|---|
| IN ULONG | ResourceManagerInformationLength, |
| OUT PULONG | ReturnLength Optional). |

This routine returns the requested information about RMO represented by ResourceManagerHandle.
Arguments:
  ResourceManagerHandle: Supplies a handle indicating the ResourceManager for which information is being requested;
  ResourceManagerInformationClass: Indicates what class of information about the ResourceManager object is being requested;
  ResourceManagerInformation: Supplies a pointer to a buffer where the ResourceManager information requested will be stored;
  ResourceManagerInformationLength: Indicates the length of the buffer pointed to by ResourceManagerInformation; and
  ReturnLength: Supplies a pointer to the location to receive a length of the information written to the ResourceManagerInformation buffer.
Return Value:
  STATUS_SUCCESS
  STATUS_ACCESS_DENIED
  STATUS_INVALID_HANDLE
  STATUS_INSUFFICIENT_RESOURCES
  STATUS_INVALID_INFO_CLASS
  STATUS_INFO_LENGTH_MISMATCH
SetInformationResourceManager

| (IN HANDLE | ResourceManagerHandle, |
|---|---|
| IN RESOURCEMANAGER_INFORMATION_CLASS | ResourceManagerInformationClass, |
| IN PVOID | ResourceManagerInformation, |
| IN ULONG | ResourceManagerInformationLength). |

This routine sets the requested information about RMO represented by ResourceManagerHandle.
Arguments:
  ResourceManagerHandle: Supplies a handle indicating the ResourceManager for which information is being modified;
  ResourceManagerInformationClass: Indicates what class of information about the ResourceManager object is being requested;
  ResourceManagerInformation: Supplies a pointer to a buffer where the ResourceManager information requested is stored; and ResourceManagerInformationLength: Indicates the length of the buffer pointed to by ResourceManagerInformation.

Return Value:
STATUS_SUCCESS
STATUS_ACCESS_DENIED
STATUS_INVALID_HANDLE
STATUS_INSUFFICIENT_RESOURCES
STATUS_INVALID_INFO_CLASS
STATUS_INFO_LENGTH_MISMATCH.

CreateEnlistment

| (IN | PHANDLE | ResourceManagerHandle, |
|---|---|---|
| IN | PHANDLE | TransactionHandle, |
| IN | NOTIFICATION_MASK | NotificationMask, |
| IN | LPVOID | TransactionKey Optional). |

This routine causes RMO to "join" a particular transaction, and receive notifications relating to it.

An RM can call this routine multiple times in order to enlist more than once on a transaction. Subsequent calls to CreateEnlistment replace a notification mask and transaction key without creating a new enlistment on the transaction.

NotificationMask may be used to request that notifications be received multiple times. For example, an RM receiving a PREPREPARE notification may request another by calling JoinTransaction and specifying the PREPREPARE flag. Thus, an RM may receive multiple PREPREPARE requests. Such requests may be refused, which may be desirable if the transaction has proceeded past the point the requested notification would have been received. For example, requesting a PREPREPARE when some RM has already been notified to PREPARE cannot be granted.

Arguments:
ResourceManagerHandle: Supplies a handle to an RM to receive notifications about the specified Transaction;
TransactionHandle: Supplies a handle to the Transaction that the RM wishes to Join;
NotificationMask: Specifies the notifications that RM would like to receive regarding this Transaction. Valid masks are as follows, and can be OR-ed together:
TRANSACTION_NOTIFY_MASK_RM: Common notifications desired by an RM (PREPARE, COMMIT, ROLLBACK, SAVEPOINT),
TRANSACTION_NOTIFY_MASK_CRM: Common notifications desired by a CRM or Superior TM (PrePrepare_Complete, PrepareComplete, CommitComplete, RollbackComplete, SavebackComplete),
TRANSACTION_NOTIFY_PREPREPARE: Notification to PrePrepare,
TRANSACTION_NOTIFY_PREPARE: Notification to PREPARE,
TRANSACTION_NOTIFY_COMMIT: Notification to COMMIT,
TRANSACTION_NOTIFY_ROLLBACK: Notification to ROLLBACK,
TRANSACTION_NOTIFY_PREPREPARE_COMPLETE: Notification that PREPREPARE is complete,
TRANSACTION_NOTIFY_PREPARE_COMPLETE: Notification that PREPARE is complete,
TRANSACTION_NOTIFY_COMMIT_COMPLETE: Notification that COMMIT is complete,
TRANSACTION_NOTIFY_ROLLBACK_COMPLETE: Notification that ROLLBACK is complete, and
TRANSACTION_NOTIFY_SAVEPOINT_COMPLETE: Notification that SAVEPOINT is complete; and
TransactionKey: Specifies an opaque pointer value that the RM would like to receive along with any notifications for this Transaction. The RM may use this to associate notifications with some object in the RM address space, thus obviating the need to perform a lookup each time a notification occurs.

Return Value:
STATUS_SUCCESS
STATUS_ACCESS_DENIED
STATUS_INVALID_PARAMETER
STATUS_INVALID_HANDLE
STATUS_INSUFFICIENT_RESOURCES
STATUS_TM_TOO_LATE.

GetNotificationResourceManager

| (IN | PHANDLE | ResourceManagerHandle, |
|---|---|---|
| IN | PTRANSACTION_NOTIFICATION | TransactionNotification, |
| IN | PLARGE_INTEGER | Timeout Optional). |

This routine queries for and returns an RM notification, if any are available.

Arguments:
ResourceManagerHandle: Supplies a handle indicating the ResourceManager for which a notification should be returned;
TransactionNotification: Supplies a pointer to a TRANSACTION_NOTIFICATION structure to be filled with the first available notification; and
Timeout: Supplies the time until which the caller wishes to block while waiting for a notification to become available. If none are available when this timeout expires, the caller returns with STATUS_TIMEOUT.

Return Value:
STATUS_SUCCESS
STATUS_TIMEOUT
STATUS_ACCESS_DENIED
STATUS_INVALID_HANDLE
STATUS_INSUFFICIENT_RESOURCES.

The following includes a more detailed description of the APIs, listed above, to implement operations on TX kernel objects by RMO kernel objects, or on EN kernel objects, after joining a transaction. The descriptions include a description of the routine, corresponding arguments, and return values.

PrePrepareComplete

| (IN | PHANDLE | EnlistmentHandle). |
|---|---|---|

This routine indicates that RM has competed pre-prepare processing (a.k.a "Phase0") of a Transaction as requested by the KTM Arguments:
EnlistmentHandle: Supplies a handle indicating the Transaction associated with the Enlistment for which the pre-prepare operation has been completed.

Return Value:
STATUS_SUCCESS
STATUS_ACCESS_DENIED

STATUS_INVALID_HANDLE
STATUS_INSUFFICIENT_RESOURCES
STATUS_TM_NOT_REQUESTED
PrepareComplete

```
(IN     PHANDLE     EnlistmentHandle).
```

This routine indicates that the RM has completed preparing a Transaction as requested by the KTM
Arguments:
EnlistmentHandle: Supplies a handle indicating the Transaction associated with the Enlistment for which the prepare operation has been completed.
Return Value:
STATUS_SUCCESS
STATUS_ACCESS_DENIED
STATUS_INVALID_HANDLE
STATUS_INSUFFICIENT_RESOURCES
STATUS_TM_NOT_REQUESTED
RollbackComplete

```
(IN     PHANDLE     EnlistmentHandle).
```

This routine indicates that RM has successfully competed rolling back the work performed by a Transaction as requested. If RM is unable to successfully rollback the Transaction as requested, it should issue a request for a full rollback via RollbackTransaction.
Arguments:
EnlistmentHandle: Supplies a handle indicating the Transaction associated with the Enlistment for which the rollback operation has been completed.
Return Value:
STATUS_SUCCESS
STATUS_ACCESS_DENIED
STATUS_INVALID_HANDLE
STATUS_INSUFFICIENT_RESOURCES
STATUS_TM_NOT_REQUESTED
CommitComplete

```
(IN     PHANDLE     EnlistmentHandle).
```

This routine indicates that RM has competed committing the work performed by a Transaction as requested.
Arguments:
EnlistmentHandle: Supplies a handle indicating the Transaction associated with the Enlistment for which the commit operation has been completed.
Return Value:
STATUS_SUCCESS
STATUS_ACCESS_DENIED
STATUS_INVALID_HANDLE
STATUS_INSUFFICIENT_RESOURCES
STATUS_TM_NOT_REQUESTED.

In addition, propagation routines may be provided for the kernel objects. Example of such routines follow.

RegisterProtocolAddressInformation

```
(IN   HANDLE        ResourceManager,
 IN   PROTOCOL_ID   ProtocolId,
 IN   ULONG         ProtocolInformationSize,
 IN   PVOID         ProtocolInformation     Optional).
```

This routine registers a resource manager as a communications resource manager for a particular protocol. It also associates a blob of information with this protocol. Only one resource manager can register for a protocol on a given machine.
Arguments:
ResourceManager: Supplies a handle to the resource manager that we are registering;
ProtocolId: The GUID identifying the protocol;
ProtocolInformationSize: The size of ProtocolInformation;
ProtocolInformation: Optional blob to associate with this protocol;
Return Values:
STATUS_SUCCESS
STATUS_INVALID_HANDLE
MarshallTransaction

```
(IN    PHANDLE        TransactionHandle,
 IN    ULONG          NumberOfProtocols,
 IN    PPROTOCOL_ID   ProtocolArray,
 IN    ULONG          BufferLength,
 IN    PVOID          Buffer,
 OUT   PULONG         BufferUsed     Optional).
```

This routine requests that a representation of the Transaction corresponding to TransactionHandle be serialized into a buffer.
Arguments:
TransactionHandle: Supplies a handle indicating the Transaction for which the commit operation has been completed;
NumberOfProtocols: Indicates the size of the protocol array;
ProtocolArray: An array of PROTOCOL_IDs (GUIDs) that specify the protocols that may be used to marshal this transaction. The array should be ordered by preference—the first protocol in the array is the preferred protocol, the second protocol is the second-most-preferred protocol, etc.;
BufferLength: Supplies the length of the Buffer that is available;
Buffer: Supplies a pointer to a buffer where the serialization of the transaction should be stored; and
BufferUsed: Supplies a pointer to a location where the actual bytes written into buffer should be stored.
Return Values:
STATUS_SUCCESS
STATUS_INVALID_HANDLE
STATUS_INSUFFICIENT_RESOURCES
GetProtocolAddressInformation

```
(IN  ULONG AddressBufferSize,
 OUT PVOID AddressBuffer,
 OUT PULONG AddressBufferUsed Optional).
```

This routine requests that the information representing all the registered protocols on the machine be serialized in AddressBuffer. This information can then be passed to another machine, and used as an argument to PushTransaction, to push a transaction to the machine on which the AddressInformation was generated.

Arguments:

AddressBufferSize: Supplies the length of the buffer that is available;

AddressBuffer: Supplies the length of the buffer that is available.

AddressBufferUsed: Supplies a pointer to a location where the buffer where the serialization of the transaction is stored.

Return Value:
STATUS_SUCCESS
STATUS_ACCESS_DENIED
STATUS_INVALID_HANDLE
STATUS_INSUFFICIENT_RESOURCES
PullTransaction

```
(OUT PHANDLE        TransactionHandle,
 IN ULONG           NumberOfProtocols,
 IN PCRM_PROTOCOL_ID ProtocolArray,
 IN ULONG           BufferLength,
 IN PVOID           Buffer).
```

This routine requests that the transaction represented by the serialization in buffer be made available by the transaction manager. A handle to the new Transaction object is returned, after the transaction has been successfully propagated by one of the registered resource managers.

Arguments:

TransactionHandle: Supplies a pointer to where the handle representing the new Transaction should be stored;

NumberOfProtocols: Indicates the size of the protocol array;

ProtocolArray: An array of PROTOCOL_IDs (GUIDs) that specify the protocols that may be used to marshal this transaction. The array should be ordered by preference—the first protocol in the array is the preferred protocol, the second protocol is the second-most-preferred protocol, etc.;

BufferLength: Supplies the length of the buffer that is available;

Buffer: Supplies a pointer to a buffer where the serialization of the transaction is stored.

Return Values:
STATUS_SUCCESS
STATUS_ACCESS_DENIED
STATUS_INVALID_HANDLE
STATUS_INSUFFICIENT_RESOURCES
PushTransaction

```
(IN HANDLE          TransactionHandle,
 IN ULONG           NumberOfProtocols,
 IN PCRM_PROTOCOL_ID ProtocolArray,
 IN ULONG           DestinationInfoLength,
 IN PVOID           DestinationInfo,
 IN ULONG           ResponseBufferLength,
 OUT PVOID          ResponseBuffer,
 OUT PULONG         ResponseBufferUsed Optional,
 OUT PULONG         PushCookie Optional).
```

This routine requests that the transaction be propagated to the destination machine using push-style propagation. Protocols will be used in the order they are listed in the ProtocolArray, until one succeeds. If no protocol is successful in propagating to the destination machine, the routine will return failure.

Arguments:

TransactionHandle: Supplies a pointer to the transaction object that should be propagated to the remote machine;

DestinationInfoLength: Supplies the length of the DestinationInfoLength that is available;

DestinationInfo: Supplies a pointer to a buffer where the "endpoint" information for the destination is stored. This may be the output received from a call to GetProtocalAddressInformation on the destination machine;

ResponseBufferLength: Supplies the length of the ResponseBuffer that is available;

ResponseBuffer: Supplies a pointer to a buffer where the serialization of the transaction is stored; and PushCookie: Supplies a pointer to a buffer a cookie representing this push request will be stored.

Return Value:
STATUS_SUCCESS
STATUS_ACCESS_DENIED
STATUS_INVALID_HANDLE
STATUS_INSUFFICIENT_RESOURCES
GetPushTransactionBuffer

```
(IN HANDLE    TransactionHandle,
 IN ULONG     PushCookie,
 IN ULONG     ResponseBufferLength,
 OUT PVOID    ResponseBuffer,
 OUT PULONG   ResponseBufferUsed Optional).
```

This call is used to retrieve the output of a call to PushTransaction, in the event that the initial call to PushTransaction received a STATUS_BUFFER_TOO_SMALL return code. In that event, the caller is to call GetPushTransactionBuffer, and pass in a sufficient buffer size.

Arguments:

TransactionHandle: Supplies a pointer to the location where the handle representing the new Transaction is to be stored;

BufferLength: Supplies the length of the buffer that is available; and

Buffer: Supplies a pointer to a buffer where the serialization of the transaction is stored.

Return Value:
STATUS_SUCCESS
STATUS_ACCESS_DENIED
STATUS_INVALID_HANDLE
STATUS_INSUFFICIENT_RESOURCES
PropagationComplete

```
(IN HANDLE    EnlistmentHandle,
 IN ULONG     RequestCookie,
 IN ULONG     BufferLength,
 IN PVOID     Buffer).
```

This routine is called by a CRM after it has successfully completed propagating a transaction.

Arguments:

TransactionHandle: Supplies a pointer to the location where the handle representing the new Transaction is to be stored;

RequestCookie: Supplies the RequestCookie that was received in the original PROPAGATE notification argument, to indicate which request has been completed;

BufferLength: Supplies the length of the Buffer that is available; and

Buffer: Supplies a pointer to a buffer where the serialization of the transaction is stored.

Return Value:

STATUS_SUCCESS
STATUS_ACCESS_DENIED
STATUS_INVALID_HANDLE
STATUS_INSUFFICIENT_RESOURCES
PropagationFailed

| (IN HANDLE | ResourceManagerHandle, |
|---|---|
| IN ULONG | RequestCookie, |
| IN STATUS | PropStatus). |

A CRM uses this routine to indicate that it has failed to propagate the transaction as requested.

Arguments:

TransactionHandle: Supplies a pointer to the location where the handle representing the new transaction is to be stored;

BufferLength: Supplies the length of the Buffer that is available; and

Buffer: Supplies a pointer to a buffer where the serialization of the transaction is stored.

Return Value:

STATUS_SUCCESS
STATUS_ACCESS_DENIED
STATUS_INVALID_HANDLE
STATUS_INSUFFICIENT_RESOURCES.

Figure 5:
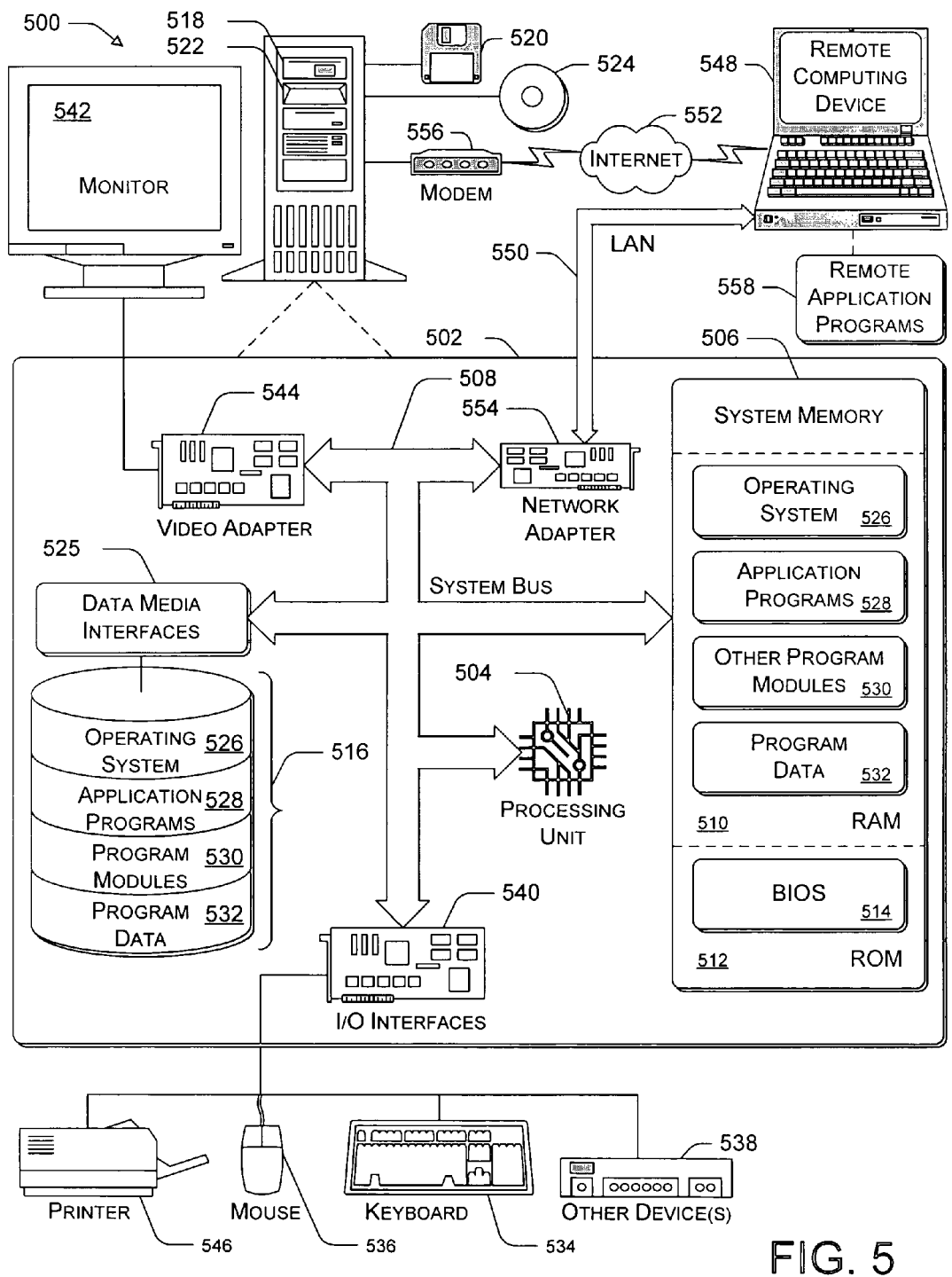
FIG. 5 illustrates a general computer environment which can be used to implement techniques described herein.

FIG. 5 illustrates a general computer environment 500, which can be used to implement the techniques described herein. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the example computer environment 500.

Computer environment 500 includes a general-purpose computing device in the form of a computer 502. The components of computer 502 can include, but are not limited to, one or more processors or processing units 504, system memory 506, and system bus 508 that couples various system components including processor 504 to system memory 506.

System bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 502 may include a variety of computer readable media. Such media can be any available media that is accessible by computer 502 and includes both volatile and non-volatile media, removable and non-removable media.

System memory 506 includes computer readable media in the form of volatile memory, such as random access memory (RAM) 510; and/or non-volatile memory, such as read only memory (ROM) 512 or flash RAM. Basic input/output system (BIOS) 514, containing the basic routines that help to transfer information between elements within computer 502, such as during start-up, is stored in ROM 512 or flash RAM. RAM 510 typically contains data and/or program modules that are immediately accessible to and/or presently operated on by processing unit 504.

Computer 502 may also include other removable/non-removable, volatile/non-volatile computer storage media. By way of example, FIG. 5 illustrates hard disk drive 516 for reading from and writing to a non-removable, non-volatile magnetic media (not shown), magnetic disk drive 518 for reading from and writing to removable, non-volatile magnetic disk 520 (e.g., a "floppy disk"), and optical disk drive 522 for reading from and/or writing to a removable, non-volatile optical disk 524 such as a CD-ROM, DVD-ROM, or other optical media. Hard disk drive 516, magnetic disk drive 518, and optical disk drive 522 are each connected to system bus 508 by one or more data media interfaces 525. Alternatively, hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, removable magnetic disk 520, and removable optical disk 524, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 516, magnetic disk 520, optical disk 524, ROM 512, and/or RAM 510, including by way of example, operating system 526, one or more application programs 528, other program modules 530, and program data 532. Each of such operating system 526, one or more application programs 528, other program modules 530, and program data 532 (or some combination thereof) may enact transactions, in accordance with the example embodiments described above, to implement all or part of the resident components that support the distributed file system.

A user can enter commands and information into computer 502 via input devices such as keyboard 534 and a pointing device 536 (e.g., a "mouse"). Other input devices 538 (not shown specifically) may include a microphone, joystick, game pad, satellite dish, serial port, scanner, and/or the like. These and other input devices are connected to processing unit 504 via input/output interfaces 540 that are coupled to system bus 508, but may be connected by other interface and bus structures, such as a parallel port, game port, or a universal serial bus (USB).

Monitor 542 or other type of display device can also be connected to the system bus 508 via an interface, such as video adapter 544. In addition to monitor 542, other output peripheral devices can include components such as speakers (not shown) and printer 546 which can be connected to computer 502 via I/O interfaces 540.

Computer 502 can operate in a networked environment using logical connections to one or more remote computers, such as remote computing device 548. By way of example, remote computing device 548 can be a PC, portable computer, a server, a router, a network computer, a peer device or other common network node, and the like. Remote computing device 548 is illustrated as a portable computer that can include many or all of the elements and features described herein relative to computer 502. Alternatively, computer 502 can operate in a non-networked environment as well.

Logical connections between computer 502 and remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, computer 502 is connected to local network 550 via network interface or adapter 554. When implemented in a WAN networking environment, computer 502 typically includes modem 556 or other means for establishing communications over wide network 552. Modem 556, which can be internal or external to computer 502, can be connected to system bus 508 via I/O interfaces 540 or other appropriate mechanisms. It is to be appreciated that the illustrated network connections are examples and that other means of establishing at least one communication link between computers 502 and 548 can be employed.

In a networked environment, such as that illustrated with computing environment 500, program modules depicted relative to computer 502, or portions thereof, may be stored in a remote memory storage device. By way of example, remote application programs 558 reside on a memory device of remote computer 548. For purposes of illustration, applications or programs and other executable program components such as the operating system are illustrated herein as discrete blocks, although it is recognized that such programs and components reside at various times in different storage components of computing device 502, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed:

1. Interfaces, stored on one or more computer-readable storage media, to be called on kernel transaction management objects, comprising:

application program interfaces (APIs) local with the transaction manager located in a kernel to implement operations in the kernel on a kernel transaction object (TX), the TX representing a transaction and being accessible by at least one process participating in the transaction, the APIs to implement operations in the kernel on the TX including:

a CreateTransaction API to create a new TX and return a handle to the new TX, wherein if the handle of the new TX closes without requesting that the TX be committed, then the transaction implicitly rolls back;

the APIs local with the transaction manager to implement kernel-level operations on a kernel resource management object (RMO), the RMO representing a relationship between a TX associated with the transaction manager and at least one resource that participates in the transaction, the resource capable of storing data in a durable state; and the APIs local with the transaction manager to implement kernel-level operations on a kernel enlistment (EN) object, the EN representing a relationship between a resource manager and the transaction, wherein each of the APIs to implement operations on the TX, the RMO, and the EN utilize handles to refer to objects, wherein each of the handles is an opaque reference to a unique object.

2. Interfaces according to claim 1, wherein at least one of the APIs calls for the TX to transmit pre-prepare messages to resource managers associated with a transaction.

3. Interfaces according to claim 1, wherein at least one of the APIs calls for the TX to transmit a prepare request to resource managers enlisted in a transaction.

4. Interfaces according to claim 1, wherein the APIs to implement operations in the kernel on the TX further include an API to call for the TX to be opened for a transaction.

5. Interfaces according to claim 1, wherein the APIs to implement operations in the kernel on the TX further include an API to call at least for the TX to commit a transaction.

6. Interfaces according to claim 1, wherein the APIs to implement operations in the kernel on the TX further include an API to call for the TX to abort a transaction.

7. Interfaces according to claim 1, wherein the APIs to implement operations in the kernel on the TX further include an API to save a current state of the transaction.

8. Interfaces according to claim 1, wherein the APIs to implement operations in the kernel on the TX further include an API TX to retrieve information about the TX for a requestor.

9. Interfaces according to claim 1, wherein the APIs to implement operations in the kernel on the TX further include an API to call for the TX to set information.

10. Interfaces according to claim 1, wherein at least one of the APIs calls for the TX to close.

11. Interfaces according to claim 1, wherein at least one of the APIs calls for a new RMO to be created.

12. Interfaces according to claim 11, wherein the new RMO is volatile.

13. Interfaces according to claim 11, wherein the new RMO is durable.

14. Interfaces according to claim 1, wherein at least one of the APIs is to implement operations on the TX by the RMO.

15. Interfaces according to claim 14, wherein the at least one of the APIs is to inform the TX that pre-preparing is complete.

16. Interfaces according to claim 14, wherein the at least one of the APIs is to inform the TX that transaction preparation has been completed by a requested resource manager.

17. Interfaces according to claim 14, wherein the at least one of the APIs is to inform the TX that a resource manager has completed rolling back a transaction.

18. Interfaces according to claim 14, wherein the at least one of the APIs is to inform the TX that a resource manager has committed to a transaction.

19. Interfaces according to claim 1, wherein at least one of the APIs calls for a resource manager to be registered as a communications resource manager for a particular protocol.

20. Interfaces according to claim 19, wherein at least one of the APIs is called when transaction propagation has been completed.

21. Interfaces according to claim 19, wherein at least one of the APIs is called when a requested transaction propagation has failed.

22. Interfaces according to claim 1, wherein at least one of the APIs calls for a representation of a transaction to be serialized into a buffer.

23. Interfaces according to claim 22, wherein at least one of the APIs calls for a transaction represented by the serialization be made available by a transaction management object.

24. Interfaces according to claim 1, wherein at least one of the APIs calls for information representing registered protocols to be serialized into a buffer.

25. Interfaces according to claim 1, wherein at least one of the APIs calls for a transaction to be propagated to a destination using push-style propagation.

26. Interfaces according to claim 25, wherein at least one of the APIs calls for the output of the API calls for the transaction to be propagated to a destination using push-style propagation to be retrieved.

27. A system comprising:
a computer with a processor configured to implement a transaction, the computer comprising:
a kernel transaction object (TX) to represent a transaction, the TX accessible by at least one process participating in the transaction;
a kernel resource manager object (RMO) to represent a relationship between a TX associated with the transaction manager and at least one resource that participates in the transaction, the resource capable of storing data in a durable state; and
a kernel enlistment object (EN) to represent a relationship between a resource manager and the transaction, wherein two-phase commit processing is executed at the kernel-level by calling application program interfaces (APIs) on the TX, the RMO, and the EN, the APIs local with the transaction manager, the transaction manager located in a kernel of an operating system, the APIs called on the TX including an API to create a new TX and return a handle to the new TX, wherein if the handle of the new TX closes without requesting that the TX be committed, then the transaction implicitly rolls back, further wherein each of the APIs to implement operations on the TX, the RMO, and the EN utilize handles to refer to objects, wherein each of the handles is an opaque reference to a unique object.

* * * * *